Jan. 12, 1943.   H. W. PURDY   2,308,105
CLAMP
Filed Dec. 11, 1939
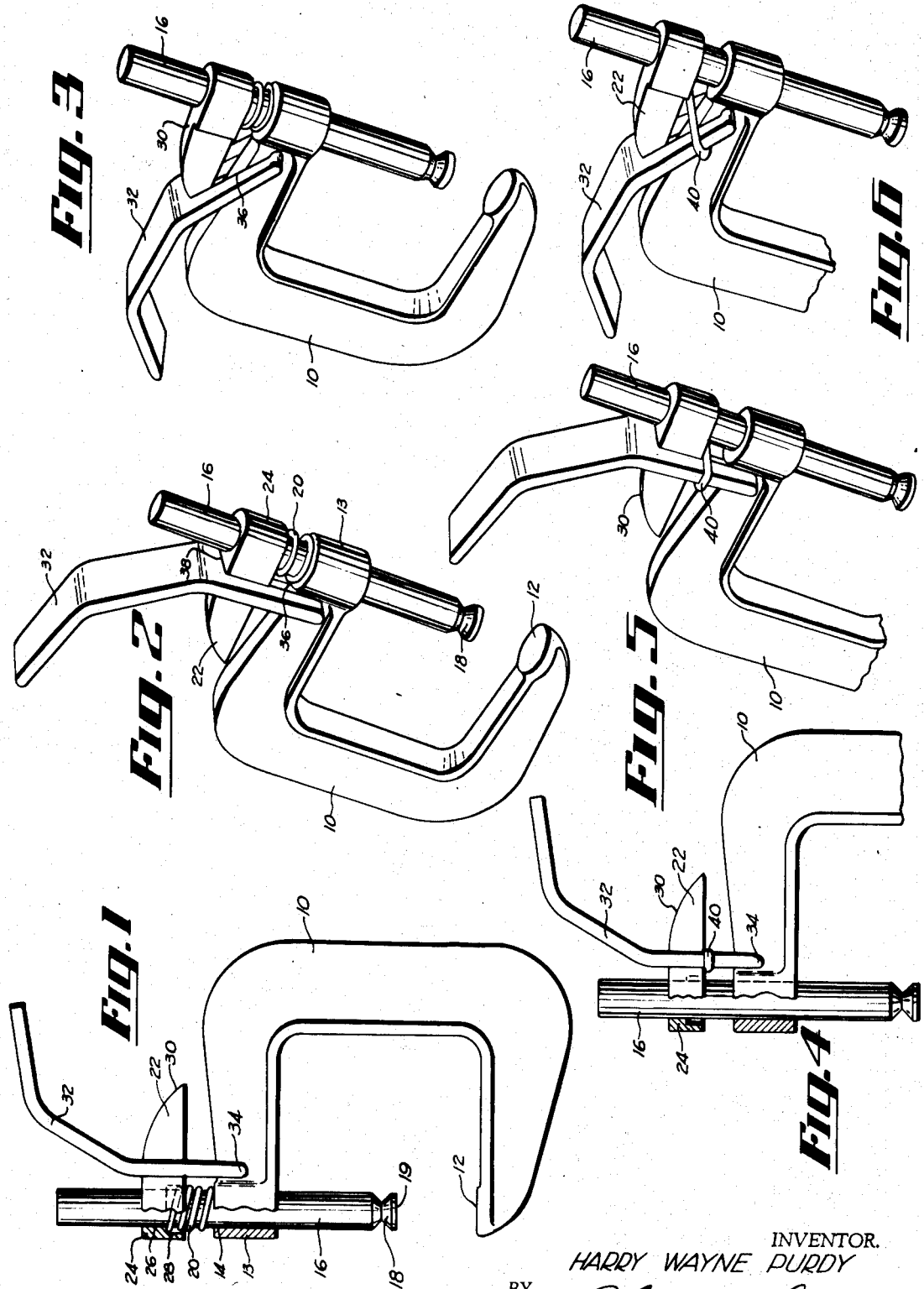
INVENTOR.
HARRY WAYNE PURDY
BY
J Edwin Coates
ATTORNEY.

Patented Jan. 12, 1943

2,308,105

UNITED STATES PATENT OFFICE 2,308,105

CLAMP

Harry Wayne Purdy, Santa Monica, Calif., assignor to Douglas Aircraft Company, Incorporated, Santa Monica, Calif.

Application December 11, 1939, Serial No. 308,631

5 Claims. (Cl. 144—305)

My invention relates to clamping devices with particular reference to a clamp suitable for one-handed operation.

Generally, wherever simple clamping devices are required, the conventional C-type screw clamps are utilized. These clamps perform the work well but, as a rule, they are inclined to be awkward in operation, particularly when the workman has only one hand free. It is desirable that clamping devices be easily installed and released by one hand for the reason that a plurality of work pieces are invariably involved and either the other hand or an extra workman is required to hold the work until the clamp is applied. Furthermore, aside from any specific examples, it is a recognized fact that the arrangement requiring the fewest hands in the performance of any piece of work or in the operation of any apparatus is the most desirable.

Another disadvantage inherent in the screw type clamp is its tendency to "walk off" the work as the screw shank is being tightened. Attempts have been made to eliminate this tendency by providing a swivelling button on the end of the screw shank but, because of careless handling and other reasons, these swivel buttons often jam and the "walk off" tendency is again present as is evidenced by the mars and scratches on material to which such a clamp has been applied.

The principal object of this invention is to facilitate one-handed operation of a clamping device.

Another object is to provide a clamp in which no rotation of the shank is necessary thereby obviating the "walk off" tendency and consequently the marring and scratching of the clamped material.

Another object is to provide a clamp which may be rapidly applied and removed from the work.

Another object of the invention is to eliminate the threaded shank forming the movable jaw of a conventional clamp.

Still other objects and advantages will become apparent in the following detail description and in the drawing in which:

Figure 1 is an elevational view partly in section of one embodiment of my invention showing a cam head, spring and lever which cooperate to control the sliding movement of a smooth cylindrical shank.

Figure 2 is a perspective view of the embodiment of Figure 1 showing the cam head, spring and lever in the released position wherein the shank may slide freely.

Figure 3 is a perspective view of the embodiment of Figures 1 and 2 showing the cam head, spring and lever in the gripping position wherein the shank is held stationary.

Figure 4 is an elevational view partly in section of another embodiment of my invention showing the cam head, lever, and a fitting on the lever replacing the spring of Figure 1.

Figures 5 and 6 are perspective views of the embodiment of Figure 4 showing the cam head and lever in the released and gripping positions respectively.

In the drawing, the numeral 10 indicates a C-shaped body or yoke for a clamp. One leg of the yoke forms a stationary jaw 12 and the other leg has a boss 13 within which is a cylindrical bore 14 adapted to receive a smooth cylindrical shank 16. The shank 16 is provided on the lower end with a button 18 which may be fastened to the shank through a swivel connection. The button has a plane surface 19 and is adapted to move with the shank 16 toward and away from the stationary jaw 12 in clamping and unclamping relation, the shank sliding freely in the cylindrical bore 14.

Exteriorly of the yoke jaw and associated with the shank 16 is a coil spring 20 and a cam head 22. One portion of the cam head is in the form of a boss 24 having a bore 26 of a diameter sufficiently large to accommodate the shank 16 in a loose fit. A still larger bore 28 is cut partially through the boss 24 concentrically with the bore 26. The larger bore is of sufficient size to accommodate the coil spring encircling the shaft between the cam head and the yoke boss 13, the arrangement of the spring being such that the cam head is urged away from the yoke as shown in Figure 1.

The cam head has a cam surface 30 upon which a lever 32 is adapted to ride. The lever 32 is pivoted at 34 to the yoke 10 and has a slot 36 formed therein. It is the upper end 38 of the slot, best shown in Figure 2, which rides on the cam surface. As the lever is swung downward about the pivot 34 to the position shown in Figure 3, the cam head is tilted. This tilting action causes the loose fit bore 26 to bind on and grip the shank 16, thereby holding it stationary.

In operation, the yoke of the clamp is held by the workman's fingers and the work to be clamped is moved into the throat of the yoke between the stationary jaw 12 and the button 18 on the end of the sliding shank 16. Next, the end of the thumb is used to press the shank downward until the jaws are in engagement with the work. Then the heel of the thumb is applied to the lever, forcing the lever to move downward about the pivot 34 tilting the cam head through contact with the cam surface causing the head to bind on and grip the shank. The cam head grips the shank during the initial part of the lever movement and the remaining lever movement serves to force the shank a slight additional distance downward, exerting pressure on the work and forming a secure clamp. In releasing the clamp, it is necessary only to pull upward on the lever whereupon the cam head will return to its normal non-binding position by reason of the pressure of the spring 20 on the underside of the cam head.

In another embodiment of the invention as depicted by Figures 4, 5, and 6, the coil spring 20 is removed and its function is performed by a wire or bar 40 fitted to the lever 32. The bar is placed across the lever slot 36 in a position against the underside of the cam head 22, thereby supporting the cam head, holding it spaced from the yoke 10. As the lever is moved downward about the pivot 34, the cam head is held by the bar 40 sufficiently long for the cam head to move into a binding position on the shank 16 whereupon the bar moves away from contact with the cam head as the lever moves on down into locked position. Once the shank has been gripped by the cam head, the further downward movement of the lever 32 will force the shank a slight additional distance downward, exerting pressure on the work just as in the embodiment first described. In releasing the clamp, it is necessary only, as before, to pull upward on the lever. The bar 40 will then again contact the underside of the cam head and force it upward into its normal non-binding position, thus freeing the shank.

While I have herein shown and described my invention in its present preferred embodiments, it will be apparent to those skilled in the art, that various modifications and changes may be made therein without departing from the spirit or scope thereof. I aim in the appended claims to cover such modifications and changes.

I claim:

1. In a clamp, a body forming a yoke, a stationary jaw on one end of said yoke, a bearing on the other end of said yoke, a shank in the form of a movable jaw adapted to slide in said bearing, moving toward and away from said stationary jaw in clamping and unclamping relation, a tiltable cam head exteriorly spaced from said yoke and adapted to selectively slide on or grip said shank, spring means for holding said cam head in the sliding position, and lever means pivotally mounted on the yoke and engaging said cam head for tilting it into the gripping position.

2. In a clamp, a body forming a yoke, a stationary jaw on one end of said yoke, a bearing on the other end of said yoke, a shank in the form of a movable jaw adapted to slide in said bearing, moving toward and away from said stationary jaw in clamping and unclamping relation, a tiltable cam head adapted to selectively slide on or grip said shank, and a lever pivotally mounted on the yoke and having integral means for tilting said cam head to the sliding or gripping position.

3. In a clamp, a body forming a yoke, a stationary jaw on one end of said yoke, a bearing on the other end of said yoke, a shank axially movable in said bearing toward and away from said stationary jaw, tiltable means carried exteriorly of said yoke and adapted to slide on or grip said shank, a cam surface on said means, and a lever pivoted on said yoke and having a portion adapted to engage the cam surface on said means to urge it into binding relation with said shank.

4. In a clamp, a yoke, a bearing on one leg of said yoke, a clamping shank slidable in said bearing, a tiltable collar surrounding said shank and adapted for sliding or binding engagement therewith, and having a cam-shaped portion, an operating lever pivoted to said yoke and adapted for engagement with said cam-shaped portion, the latter being slightly eccentric with respect to the pivotal axis of said lever, whereby movement of said lever will cause said collar to bind on said shank and further movement of said lever will urge said collar and said shank toward the other leg of said yoke.

5. In a clamp adapted for one-handed operation, a C-shaped yoke, a stationary jaw on one leg of said yoke, a bearing on the other leg of said yoke, a movable jaw having a shank slidably mounted in said bearing for movement toward and away from said stationary jaw, a tiltable collar carried exteriorly of said yoke and surrounding said shank, said collar having a bearing adapted for sliding or gripping engagement with said shank and being provided with a laterally extending abutment, a unitary lever pivoted to said yoke close to said first mentioned bearing and swingable in the plane of said yoke, a cam surface on said abutment slightly eccentric with respect to the pivotal axis of said lever and a portion of said lever being adapted for operative engagement with said cam surface, movement of said lever away from the axis of said shank forcing said collar into gripping engagement with said shank and movement of said lever toward said axis releasing said collar for sliding engagement with said shaft, whereby the yoke may be held with the fingers, the movable jaw moved by the thumb and the lever swung into the operative position by the heel of the thumb.

HARRY WAYNE PURDY.